UNITED STATES PATENT OFFICE.

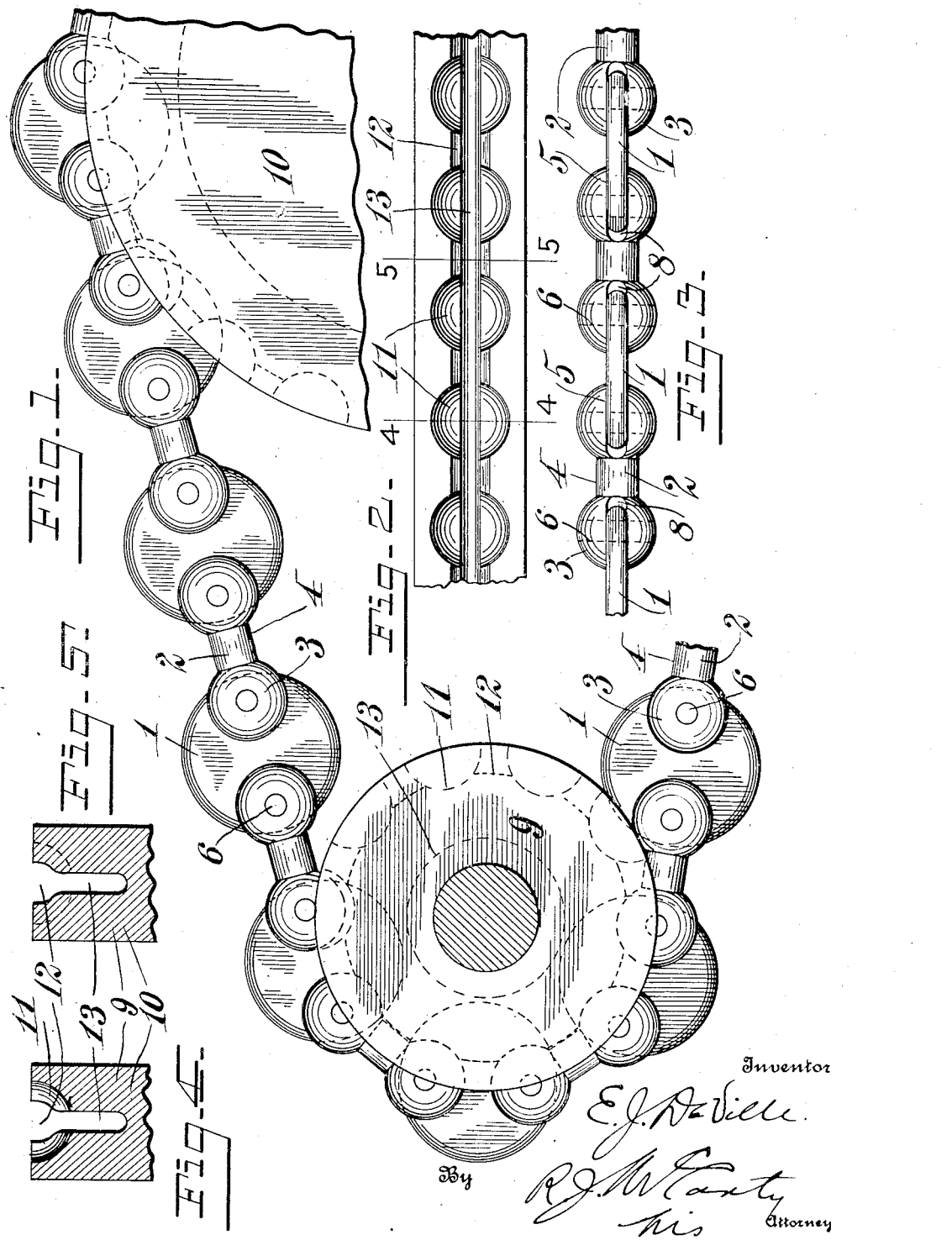

EDWARD J. DE VILLE, OF DAYTON, OHIO.

DRIVE-CHAIN.

1,358,942.  Specification of Letters Patent.  Patented Nov. 16, 1920.

Application filed January 14, 1920. Serial No. 351,459.

*To whom it may concern:*

Be it known that I, EDWARD J. DE VILLE, a citizen of the United States, residing at Dayton, in the county of Montgomery and State of Ohio, have invented certain new and useful Improvements in Drive-Chains, of which the following is a specification.

My invention relates to improvements in power transmitting appliances and more particularly to an improved chain and wheel.

An object of the invention is to provide a chain for transmitting power or motion which may be manufactured at a comparatively low cost, owing to the chain parts being made on well known machines, such as automatic screw and punch machines.

A further object is to provide a drive chain which is made of a minimum number of parts and is especially adaptable for transmitting power or motion from small electric motors.

A further object is to provide a chain each link of which has two driving contact points and which is substantially noiseless in its action, and is otherwise desirable for transmitting motion from a driving wheel.

In a more particular description of my improved power transmitting device, reference is made in general terms to the accompanying drawings, of which Figure 1 is an elevation of a portion of the chain, a complete wheel and a portion of a wheel, over which the drive chain passes. Fig. 2 is a plan view of the periphery of a portion of one of the drive wheels. Fig. 3 is a similar view of a portion of the drive chain. Fig. 4 is a section through the periphery of the wheel on the line 4—4 of Fig. 2 and Fig. 5 is a section on the line 5—5 of Fig. 2.

In a more particular description of the invention the same reference characters will denote the same parts in the drawings and description.

The drive chain consists of alternate uniformly shaped links in the form of disks —1— and chain members —2—. The links are uniform in size and thickness and may be formed in a screw machine. The peripheries of the links are preferably rounded transversely. The chain members —2— are of dumb bell shape, the ends —3— being enlarged or of spherical shape and joined by intervening connecting portions —4—. The ball ends —3— are slotted as at —5— to receive the links or disks —3—. Pins —6— form pivotal connections between the said disks and the ends —3— of the chain members. There is sufficient space, as shown at —8—, between the peripheries of the links or disks —1— and the ends —3— of the connecting chain portions —4— to permit the chain to yield on the pivots —6— and conform to the contour of the wheel in passing therearound. The wheels —9— and —10— are the same in construction, the only difference being in their diameters. In the periphery of each of the said wheels a series of uniform sockets —11— are formed with connecting depressions —12—. The sockets —11— receive the ball ends —3— of the chain members —4—, and the said sockets —11— and the balls —3— form the driving parts. It will thus be seen that each link of the chain has two driving contact parts. The wheels also have deeper grooves —13— which extend into the center of the peripheries thereof, (as shown in broken lines), a sufficient distance to receive the chain link connections or disks —1— as the chain moves. The disks or links —1—, traveling through said grooves —13— guide the chain in its travel around the wheels and thus keep it in proper position at all times.

While I have shown the connecting elements —1— of the chain to be in the form of a disk or circular plates it will be apparent that the upper portion of each of said disks might be removed, in which case they might not properly be termed disks.

As has been made clear, the purpose of these parts or connecting links in the chain, is to act as guides in conjunction with the deep grooves —13— in the wheel, as well as to perform connecting parts between the driving elements or links —2— of the chain.

It is clearly apparent from the drawings that the spherical ends —3— of the chain members —2— and two of the sockets —11— form the driving connections between the chain and the wheel.

Having described my invention, I claim:

1. A drive chain comprising a plurality of chain members of a substantially dumb bell form, and a plurality of intervening connecting parts pivotally connected to the ends of said chain members, said connecting parts being of substantially disk form and serving also as guides for the chain in its movement.

2. A chain comprising a plurality of driving links each consisting of solid spherical ends integrally united by a shank or body portion, said spherical ends each having a slot therein, and a series of connections intervening between said driving links each consisting of a flattened member projected into the slots in said spherical ends and pivotally connected thereto, said flattened link connecting members being adapted to guide the chain in its travel.

3. A chain comprising a plurality of disk-like elements, and a corresponding plurality of uniform links each consisting of two solid spherical shaped heads with an intervening integral shank, the said spherical heads being slotted to receive the disk-like elements, and pivotal connections extending through said spherical heads and the portions of the disk-like members lying within said slots, the distance between the pivotal connections being uniform throughout the length of the chain.

4. In a chain, the combination of a plurality of chain links each consisting of two solid spherical heads joined by a shank, the said heads having alined slots, a plurality of elements forming connections between said links and guides for the chain, and pins extending transversely through the center of said heads and pivotally connecting the said elements in the slots of said spherical heads.

5. In a device for transmitting motion, a plurality of links forming a chain, said links consisting each of spherical formed ends united by a shank, the said ends being slotted longitudinally, a plurality of disk-like members forming link connections and guides for the chain, pivot pins extending through said ends and the portions of the disk-like members lying therein, and a wheel provided with a series of peripheral sockets to receive the spherical ends of said links and forming in connection with said links two driving contact points.

6. A drive chain consisting of a plurality of links each consisting of two solid spherical ends united by an integral reduced portion, each spherical end having a longitudinal slot, a plurality of flat link connecting and chain guide members, portions of which enter the slots in said spherical ends, pivotal connections between said spherical ends and the portions of said flat link connecting and chain guide members, and a wheel having peripheral sockets to receive the spherical ends of said links.

In testimony whereof I affix my signature.

EDWARD J. DE VILLE.